June 5, 1934.　　　J. W. TATTER　　　1,961,435
BRAKE MECHANISM
Filed Nov. 21, 1928　　　2 Sheets-Sheet 1
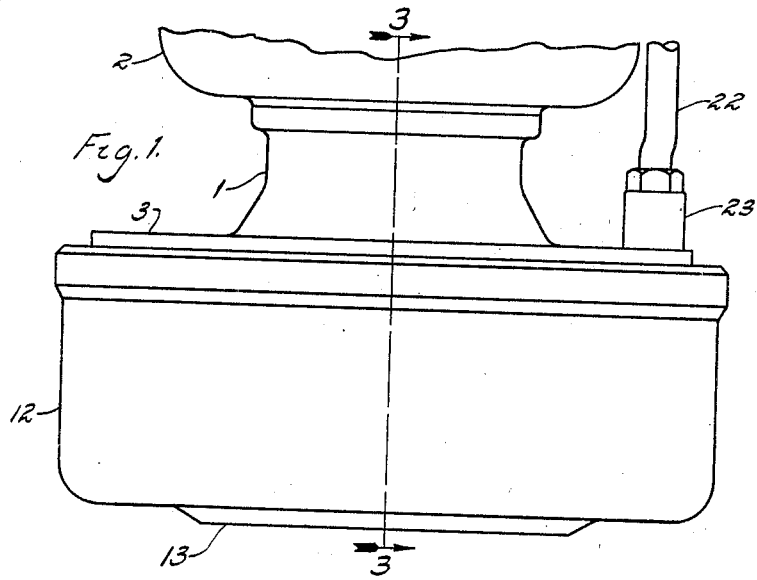
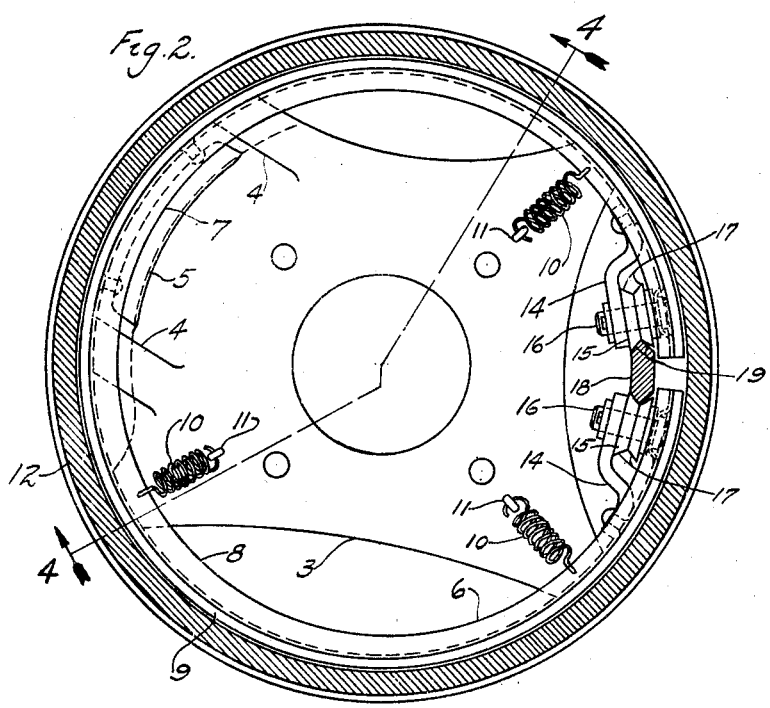
INVENTOR
John W. Tatter
BY Hill & Hill
ATTORNEYS.

June 5, 1934.  J. W. TATTER  1,961,435
BRAKE MECHANISM
Filed Nov. 21, 1928   2 Sheets-Sheet 2
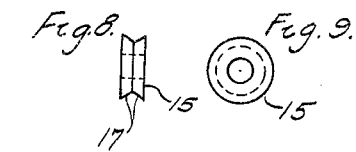
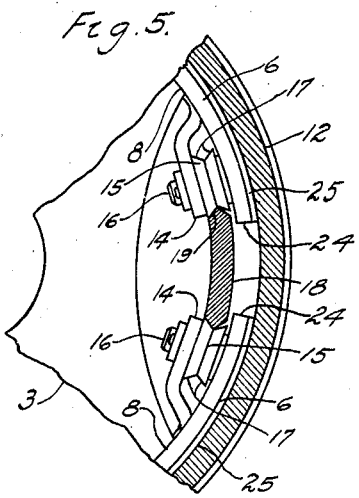
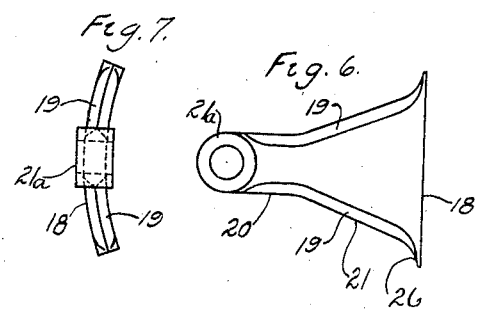
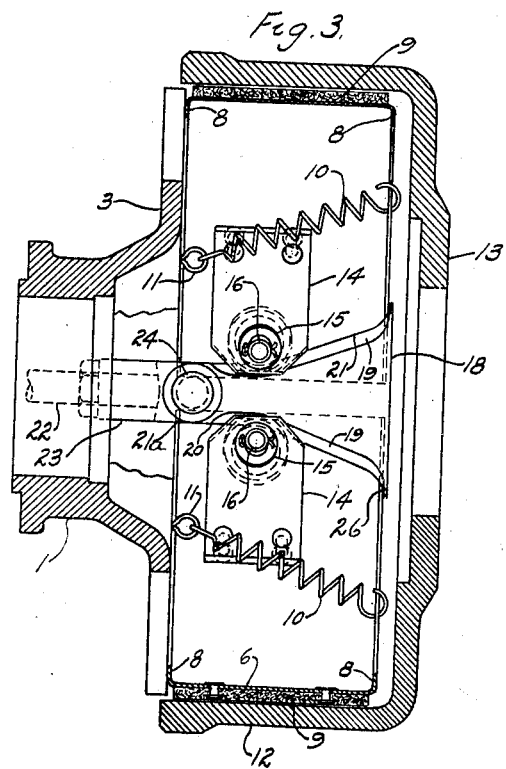
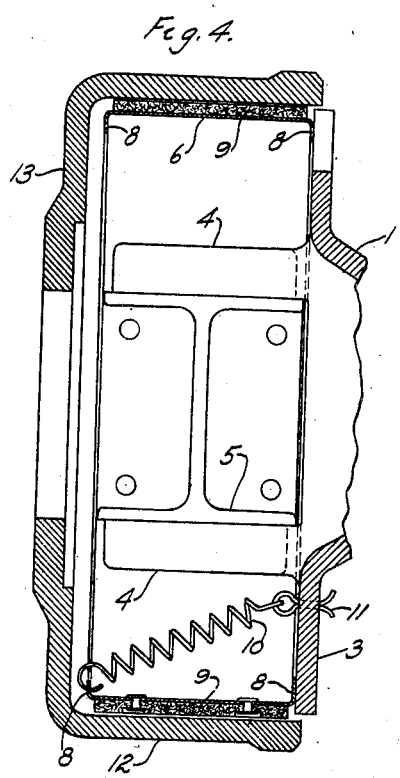
INVENTOR
John W. Tatter
BY
ATTORNEYS

- Patented June 5, 1934

UNITED STATES PATENT OFFICE 1,961,435

BRAKE MECHANISM

John W. Tatter, Oak Park, Ill., assignor to Lewis Differential Company, Chicago, Ill., a corporation of Illinois Application November 21, 1928, Serial No. 320,845

11 Claims. (Cl. 188—78)

My invention relates to improvements in brake mechanisms in which an internal brake is expanded by means of rollers and wedge therebetween; and the objects of my improvement are, first, to provide for expanding an internal brake smoothly, equally and without chattering; second, to provide a brake expanding means capable of exerting powerful leverages with a minimum of effort by the operator; third, to provide a rolling contact for the brake expanding means, thus eliminating losses of applied power from frictional contacts; fourth, to provide a means for expanding a brake whereby the expanding forces are applied approximately parallel to the brake band members at any adjusted positions; fifth, to provide a brake expanding means with a constant leverage ratio at any adjusted position; and sixth, to provide an expanding member capable of being supported by its means for engaging the brake band.

I attain these objects by the mechanism illustrated in the accompanying drawings, in which, Fig. 1 is a plan view of the brake and brake drum assembled at the rear of a transmission, Fig. 2, an end view of the brake assembly with a portion of the drum removed, Fig. 3, a vertical section of the brake assembly on the line 3—3 Fig. 1, Fig. 4, a section of the brake assembly on the line 4—4, Fig. 2, Fig. 5, an end view of the brake expanding mechanism when the brake lining is worn thin, Fig. 6, a plan view of the expanding wedge member, Fig. 7, an end view of the expanding wedge member, Fig. 8, a side view of one of the rollers, and Fig. 9, a plan view of one of the rollers.

Similar numerals refer to similar parts throughout the several views.

The brake assembly is shown, in the accompanying drawings, mounted on the spider 1 which in turn is mounted at the rear of a transmission case 2 as shown in Fig. 1. While my invention is particularly effective and economical for such an installation in conjunction with the propeller shaft of a motor vehicle, it is to be understood that my brake mechanism may be applied at various positions and locations on motor vehicles and other types of mechanisms requiring braking means.

The spider 1 is provided with a flange 3 which forms the backing plate for the brake mechanism. The flange 3 is provided with anchor lugs 4 between which fits the anchor bracket 5 which is riveted to the brake band 6.

It is to be noted that the brake band 6 is of the eccentric type having a thicker section 7 adjacent its anchor bracket 5. The brake band 6 is made of pressed material having flanges 8 whose depth may be varied to provide for the requisite strength and eccentric characteristics. The lining 9 may be riveted to the brake band 6. One of the flanges 8 of the brake band 6 may be provided with holes through which the springs 10 may be attached, the springs 10 being anchored to the pins 11 which in turn are fastened to the flange 3.

It is to be noted that the brake band is thus floatably mounted between the anchor lugs 4 and is resiliently restrained against the flange 3 at three or more points as may be required.

In an internal brake, the lining 9 must contact throughout its full length at all times to prevent chattering and this is especially true of brake installations in conjunction with propeller or drive shafts. The eccentric brake band 6, thus floatably mounted, will maintain a true diameter and cause the brake lining 9 to always contact, throughout its length, with the brake drum 12 until the brake lining 9 is worn out.

The anchor bracket 5, together with the anchor lugs 4 may be so located relative to the ends of the brake band 6 as to compensate for any increase or decrease in the operative efficiency of the brake due to the forward or reverse revolutions of the brake drum 12. With the forward revolution of the brake drum 12, the brake band 6 may have its anchorage located approximately 230° to 260° in a forward direction from its ends, which would provide an anchorage located approximately 100° to 130° in a reverse direction from the ends of the brake band 6. The brake drum 12 is provided with an open end fitting over the edge of the flange 3 and a flange 13 which provides for fastening to a propeller or drive shaft flange (not shown). A bracket 14 is suitably fastened to the brake band 6 at each of its ends. Between the bracket 14 and the brake band 6, a roller 15 is suitably mounted on the pin 16 which in turn is suitably mounted in the bracket 14 and the brake band 6. The roller 15 is provided with a groove having approximately flat sides 17 forming an angle therebetween.

A wedge member 18 is suspended between the rollers 15, the wedge member having approximately flat sides 19 forming an angle thereon, the upper portion of the angle riding in the groove on the rollers 15. It is to be noted that the angle of the sides of the groove in the rollers 15 is greater than the angle of the flat sides 19 on the wedge member 18, thus allowing the wedge member 18 to accommodate the tipping of the rollers 15 due to being moved near to the drum when the brake lining 9 wears away and also when the ends of the brake band 6 moves circumferentially around the drum 12. The operating sides of the wedge member 18 may be formed with a parallel portion 20 which, in turn, may unite with an angular section 21, the included angle of which may be varied to provide any desired ratio of wedge leverage which can be sufficiently great to require but little effort, on the part of the operator, to develop the proper braking effect on any vehicle or mechanism.

The wedge member 18 may be made of sufficient length to allow for the necessary expansion of the ends of the brake band 6 to care for any wear on the brake lining 9. The wedge member 18 may be provided with an eye 21a for connection to a brake rod 22 with its yoke 23 and pin 24, the brake rod 22 being suitably connected to the operator's hand lever (not shown). It is to be noted that the only adjustment necessary will be to vary the length of the connections between the hand lever (not shown) and the wedge member 18. It is to be noted further that the spring tension in the band 6 will tend to maintain the rollers 15 in contact with the wedge member 18 at all times, the springs 10 assisting in a small degree.

The brackets 14 may be offset, as shown in Fig. 3, on the brake band 6 to provide for the necessary operating travel of the wedge member 18. It is to be further noted that the wedge member 18 may, if desired, have each of its angular operating surfaces on each side made with a varying included angle to accommodate the varying angle of contact with the rollers 15 due to the ends of the brake band 6 expanding to a greater diameter and a consequent greater gap between the ends 24 when the brake lining 25 is nearly worn away as shown in Fig. 5. The wedge member 18 is made to operate in a position approximately parallel with the outer diameter of the brake band 6 and lining 9 at all times, moving outwardly toward the brake drum 12 as the brake lining 9 wears away, always however, maintaining its position of contact with the rollers 15 in such manner as to exert oppositely disposed expanding pressures in planes approximately parallel to the longitudinal plane of each end of the brake band 6. The wedge member 18 is also provided with a flange 26 which prevents it being operatively moved entirely through between the rollers 15.

What I claim as my invention is:

1. In a brake mechanism comprising a brake drum, the combination of a brake band, rotatable members mounted on the ends of said brake band, and a member operatively supported between said rotatable members, said member having a portion adapted to pass between said rotatable members without causing said rotatable members to move toward or away from each other, said member further being provided with a portion adapted to pass between said rotatable members and thereby cause said rotatable members to move toward or away from each other.

2. In a brake mechanism comprising a brake drum, the combination of a brake band having ends adapted to be moved toward or from each other, rotatable members mounted in the ends of said brake band, said rotatable members each having a groove with flat sides, and a member for moving the ends of said brake band toward or from each other, said member having angular surfaces engaging the groove in said rotatable members.

3. In a brake mechanism comprising a brake drum, the combination of a brake band adapted to engage the brake drum, members rotatably mounted in the ends of said brake band, said members having a groove with flat sides forming an angle therebetween, and a wedge member engaging the groove in said members in the ends of said brake band, said wedge member having sides with flat surfaces forming an angle therebetween, said angle on said wedge member being of a lesser number of degrees than the angle between the flat sides of the grooves in said members rotatably mounted on said brake band.

4. In a brake mechanism comprising a brake drum, the combination of a brake band having forked ends, a friction lining suitably attached to said brake band and adapted to engage said brake drum, pins suitably mounted in the forked ends of said brake band and extending therebetween, members rotatably mounted on each of said pins, each of said members having a groove around its periphery, a wedge member having edges engaging the grooves in said members on said pins, said wedge member being capable of being moved to and fro between said members on said pins, said wedge member being thereby supported between said members on said pins.

5. In a brake mechanism comprising a brake drum, the combination of a brake band, rollers mounted on each of the ends of said brake band, each of said rollers having a continuous track, said track having sides with an angle therebetween, and a member actuating the ends of said brake band toward or away from each other, said member having portions engaging the track in each of said rollers mounted in said brake band, said portions of said member being formed with sides having an angle therebetween, said angle on said member being smaller than the angle of the track of said rollers.

6. In a brake mechanism comprising a brake drum, the combination of a brake band having ends capable of being moved toward or from each other, members mounted on each of the ends of said brake band, said members each having a V-shaped track, and a member having correspondingly shaped edge portions adapted to engage the tracks of said members mounted on each of the ends of said brake band, said member being capable of operating in the tracks of said members on said brake band at the varying positions assumed by the ends of said brake band throughout their travel toward or from each other.

7. In a brake mechanism comprising a brake band having ends capable of being moved toward or from each other, the combination of members rotatably mounted in each end of the brake band and a member adapted to engage said members rotatably mounted in each end of the brake band, said member being provided with an eye, a parallel portion adjacent said eye, a wedge portion adjacent said parallel portion, and shoulders adjacent said wedge portion.

8. In a brake mechanism comprising a brake drum, the combination of a brake band having ends capable of being moved toward or from each other, rotatable members mounted on radially disposed axes carried on each of the ends of said brake band, said members each having a V-shaped track, and a member having correspondingly shaped edge portions adapted to engage the tracks of said members mounted on each of the ends of said brake bands, said member being capable of operating in the tracks of said members on said brake band at the varying positions assumed by the ends of said brake band throughout their travel toward or from each other.

9. In a brake mechanism comprising a brake drum, the combination of a brake band having ends adapted to be moved toward or from each other, rotatable members mounted in the ends of said brake band, said rotatable members each having a groove with outwardly flaring side portions, and a member for moving the ends of said brake band away from each other, said member engaging the groove in said rotatable members and having surfaces conforming substantially to the outwardly flaring side portions of said rotatable members.

10. Brake mechanism comprising a brake drum, an internal expansible brake band within said drum, a pair of rollers carried by the adjacent free ends of said band, the axes of said rollers extending substantially radially of said drum, a wedge member disposed between said rollers and consisting of a longitudinally slidable plate arcuate in transverse section, said plate having cam edges engaging said rollers, and means for moving said plate axially of said drum.

11. Brake mechanism comprising a brake drum, an internal expansible brake band within said drum, a pair of rollers carried by the adjacent free ends of said band, a wedge member having a portion with parallel edges normally engaging between said rollers, and adjacent thereto a portion with outwardly flaring cam edges, and means for moving said wedge member longitudinally to force said cam edges between the rollers and thus expand said band.

JOHN W. TATTER.